3,171,719
CYCLIC PROCESS FOR THE PRODUCTION OF TITANIUM DIOXIDE
Robert M. McKinney, 52 Ridge Road, Westminster, Md.
No Drawing. Filed Apr. 16, 1963, Ser. No. 273,529
4 Claims. (Cl. 23—202)

This invention relates to the production of titanium compounds from titaniferous materials. More particularly it relates to production of commercially useful binary titanium compounds from titanium ores wherein the titanium is first converted to the nitride and the iron content is recovered as metallic iron.

The titanium pigment industry makes use of large quantities of ilmenite and rutile, these containing from 40 to 96% of $TiO_2$ with iron being the major accompanying metallic element. The disposal of sulfate of iron and of chloride of iron from the pigment operations has been a major problem but the consumption of sulfuric acid and of chlorine in the formation of these iron compounds is of greater concern for economic reasons. Rutile is the preferred raw material for the chloride process as less chlorine is consumed but the higher iron containing ilmenite (the less costly ore) is necessary for the sulfate process in order to obtain water soluble titanium sulfate.

It is among the objects of this invention to convert any of the currently used titanium ores or other titaniferous raw materials to commercially useful titanium compounds such as the halides and the oxide using inexpensive reactants. An additional object is the conversion of the ore to metallic iron and to titanium nitride and the latter into a halide of titanium by reaction with a recoverable and reuseable gaseous halide. A further object is the production of titanium tetrachloride from titaniferous materials by first converting the titanium content to the nitride under reducing conditions and then reacting the nitride with hydrogen chloride. A still further object is the production of pigmentary titanium dioxide from the less expensive titanium ores by chloride process without the use of elementary chlorine.

The above and other objects are realized by my novel process which comprises subjecting a titaniferous material in the presence of a reducing agent and nitrogen at a temperature of the order of about 1000° C. to convert the titanium to the nitride and reduce the iron to the metallic state, reacting the titanium nitride content of the furnace product with gaseous hydrogen chloride and recovering the resulting titanium tetrachloride. The latter is suitable for conversion to the dioxide by either hydrolysis or oxidation with recovery of the chlorine content for reuse as the chloride of hydrogen in the conversion of the nitride to the tetrachloride. The iron remains as a chlorination residue and is suitable as feed material to an open hearth furnace or for use in other metal operations. The reactions taking place according to a preferred procedure may be represented in part by the following equations:

$$2FeTiO_3 + N_2 + 6C \rightarrow 2TiN + 2Fe + 6CO$$
$$4TiN + 16HCl \rightarrow 4TiCl_3 + 4NH_4Cl$$

It is noted that the second equation shows the formation of the trichloride of titanium but when operating at a temperature of the order of about 650° C., titanium tetrachloride is evolved. It follows that the actual operations is not as simple as indicated by the equations. There are three products of commercial value resulting from the chlorination reaction, namely, (1) metallic iron which remains behind, (2) ammonium chloride which is condensed on cool surfaces, and (3) titanium chloride which boils at about 137° C. This $TiCl_4$ may be condensed as an anhydrous liquid or may be absorbed in water solution. There will also be present in these chloride containing gases some unreacted hydrogen chloride and some decomposition products of ammonia particularly if the chlorination takes place above about 650° C. The conversion of the tetrachloride to the oxide is readily accomplished by oxidation or by hydrolysis and the latter may be practised without cost penalty since hydrogen chloride is reuseable in the process. One may select any one of three modes of operation, namely, (1) gas phase oxidation as disclosed in U.S. Patents 2,488,439, 2,559,638, 2,689,781 or 3,078,148, (2) gas phase hydrolysis as disclosed in U.S. Patent 1,931,380, and (3) aqueous solution hydrolysis as disclosed by Kubelka and Srbek in U.S. Patent 2,062,133. Needless to say, one may convert the chlorine containing by-product to anhydrous HCl gas for conversion of more TiN to $TiCl_4$ in cyclic manner. The use of sulfuric acid as a dehydrating reagent and/or as a reagent to convert the $NH_4Cl$ to $(NH_4)_2SO_4$ is suggested and this less volatile acid thus serves to yield an ammonium salt useful as a fertilizer and also to remove water from the HCl, if and when excess water is used to produce pigmentary $TiO_2$.

The following examples are given as a further disclosure of my invention but it is understood that my novel process is not limited to the procedures therein recited.

*Example I*

Indian ilmenite containing 53% $TiO_2$ and 31% iron ground to pass a 200 mesh screen was blended with powdered coke using 24 parts of the latter per 100 parts of the ilmenite. A small amount of starch paste was added to the mixture to get a moist mass and the mixture was then slowly dried to obtain a granular mass. A portion of this mass was placed in a porcelain boat which in turn was inserted into a silica tube with the latter extending through a stationary electric furnace (resistance type). Nitrogen from a suitable supply was fed to one end of the silica tube and the other end was connected to a cooled Pyrex chamber and this in turn fitted with discharge to a condenser apparatus maintained at a temperature of from —5° to 0° C. The tube and boat were heated to a temperature of between 1000° and 1100° C. while nitrogen was being admitted to the apparatus. Nitrogen was absorbed by the titanium to form TiN as reduction took place with formation of metallic iron and oxides of carbon. After the operation had run for a period of one hour and substantially all of the oxygen from the ilmenite had been removed, the furnace was cooled and the boat examined. It was found to contain a mixture of metallic iron and titanium nitride with some residual reactants. The boat was reinserted in the furnace tube and the temperature raised to about 650° C. The tube through which nitrogen was added in the nitriding operation was now connected to a supply of anhydrous HCl and the passage of this gas was continued until no further reaction took place as revealed by no further condensation of $NH_4Cl$ in the air cooled condenser and of $TiCl_4$ in the refrigerated condenser. Metallic iron remained in the boat and was in suitable form for use in foundries, as feed to open hearth furnaces, etc. The titanium tetrachloride was removed from the collection chamber, was evaporated and the vapor led to an apparatus such as that described in U.S. Patent 3,078,148 where it was oxidized to pigmentary $TiO_2$ with formation of some HCl. This gas mixture is suitable for reuse in the process, preferably when admixed with hydrogen or a compound of hydrogen useful in converting the chlorine to HCl.

*Example II*

The operation of Example I was repeated except that the feed in this case was Indian ilmenite containing 60% $TiO_2$ and 25.5% Fe. This finely ground ore was mixed with petroleum coke and a small amount of starch paste.

The moistened mass was dried to a granular product and furnaced as in Example I in an atmosphere of nitrogen. After the nitride had been formed the temperature was dropped to within the range of 625° to 675° C. and the chlorides of titanium and ammonia were separately recovered. In this instance the gaseous titatnium was absorbed in hydrochloric acid which was accompanied by evolution of HCl gas, the latter being useful in the conversion of more TiN to $TiCl_4$. The titanium chloride was hydrolyzed in accordance with the teachings of Kubelka and Srbek (U.S. Patent 2,062,133). The product was pigmentary titanium dioxide in rutile form after the customary finishing treatments. The by-product acid of approximately constant boiling strength is useful as the solvent for more of the anhydrous chloride and may be purified by distillation to remove any ammonium chloride which may build up in the recycle system.

*Example III*

The process of Example I was repeated except that the $TiCl_4$ product was hydrolyzed in the gas phase by the method outlined in U.S. Patent 1,931,380 (interaction of steam with $TiCl_4$ at a temperature between 300° and 400° C.). The product was pigment useful $TiO_2$ and by avoiding any substantial excess of water in the reaction the HCl gas was directly useful in the formation of more $TiCl_4$ by reaction with the titanium nitride produced in the first step of my process.

*Example IV*

A portion of the ilmenite containing 60% $TiO_2$ was placed in the boat apparatus previously used and ammonia gas was passed for two hours into the tube which was maintained at a temperature of about 1000° C. The charge was converted to a mixture comprising metallic iron, titanium nitride and some unreacted oxides. This product was further treated to produce $TiCl_4$ and $TiO_2$ as in Example II.

*Example V*

The operation of Example IV was repeated except that an equal volume mixture of nitrogen and natural gas was used instead of ammonia. Similar results were obtained.

It is evident from the above that my process is suited to any titanium raw material now being used in the titanium pigment industry. The greatest savings are to be realized when using ilmenite or other high iron containing ores. However, rutile may also be used in the process. The reducing agent to be employed may be any one of several as for example; hydrogen, ammonia, charcoal, coke, natural gas, hydrocarbons and other reactants capable of removing oxygen from the titaniferous starting material.

The optimum temperature of reduction and nitride formation is found by experience and will vary with the selected reactants. It will usually be within the range of from 900° C. and the softening point of the iron by-product (around 1200° C.). A stationary furnace is disclosed as useful in the above examples but it is understood that commercial installations will employ other heating means for the nitride formation step as well as for the chlorination. These operations may be carried out by making use of fluid bed and plasma jet techniques. Other modifications will become evident to a plant design engineer.

The temperature of chlorination (reaction of the nitride with hydrogen halide) may be chosen over a wide range in the vicinity of 500° to 750° C. with 600° to 700° C. having been found to give good rates of reaction. The higher temperatures are useful but it is obvious that one should resort to as low a temperature as will yield the product at an economic rate.

Ammonium chloride is stated to be a reaction product but this may be wholly or in part dissociated into $N_2$, $H_2$ and HCl. One does not need to completely separate the $TiCl_4$ from the other volatilized reaction products since $TiCl_4$ may be hydrolyzed or oxidized to pigmentary oxide in the presence of these products and the whole of the chlorine content may be recovered as HCl by methods well known in the art. The conversion of ammonium chloride to ammonium sulfate and HCl by treatment with sulfuric acid is well known and the use of this reaction to recover the HCl for recycling is an attractive option.

The use of ammonia as a combined reducing and nitriding agent is disclosed in Example IV above. It is obvious that dissociation of the ammonia will occur and the mixture of hydrogen and nitrogen will act to reduce and nitride the titaniferous ore.

It is well known that iron may be separated by physical means from a mixture of metallic iron and titanium nitride. Accordingly, it is within the scope of my invention to use such means to get a high quality iron by-product.

While the examples given above are limited to batch operation, it is to be understood that my invention is not limited thereto as the steps may be operated in either a continuous or discontinuous manner. Further, it is to be understood that many modifications as to reagents and apparatus may be made without departing from the spirit of the invention. It is also obvious that the $TiCl_4$ of my process may be used in the production of titanium metal and it is generally understood that halides such as the bromide and the iodide are equivalent to the chloride.

I claim as my invention:

1. A cyclic process for the production of titanium dioxide from titaniferous material which comprises (1) furnacing said materials in presence of a reducing agent and in a nitrogen containing atmosphere thereby converting the titanium content to the nitride and the iron content to the metallic state, (2) separating the iron therefrom as a residue by reacting the nitride portion of the solid product at an elevated temperature with gaseous hydrogen chloride thereby vaporizing the titanium and nitrogen components of said nitride as volatile chlorides, (3) converting the titanium chloride product to titanium dioxide and gaseous hydrogen chloride by reaction with steam at an elevated temperature, (4) recovering the titanium dioxide, and (5) recycling the gaseous hydrogen chloride to convert more titanium nitride to the chloride.

2. A cyclic process for the production of titanium dioxide from titaniferous materials which comprises (1) furnacing said materials in presence of a reducing agent and in a nitrogen containing atmosphere thereby converting the titanium content to the nitride and the iron content to the metallic state, (2) separating the iron therefrom as a residue by reacting the nitride portion of the solid product at an elevated temperature with gaseous hydrogen chloride thereby vaporizing the titanium and nitrogen components of said nitride as volatile chlorides, (3) converting the titanium chloride to titanium dioxide and chlorine by reaction with oxygen at an elevated temperature, (4) recovering the titanium dioxide, (5) admixing the chlorine with hydrogen gas, and (6) recycling this admixture to convert more titanium nitride to the chloride.

3. A cyclic chloride process for the production of titanium dioxide which comprises (1) converting an iron containing titanium ore to metallic iron and titanium nitride by subjecting said ore at an elevated temperature in the presence of a reducing agent to a nitrogen containing atmosphere, (2) reacting the nitride portion of the resulting solid product at a relatively low elevated temperature with gaseous hydrogen chloride thereby vaporizing the titanium and nitrogen components of the nitride as volatile chlorides while leaving the iron behind as a recoverable metal residue, (3) hydrolyzing the titanium chloride in the vapor state by reaction with steam at an elevated temperature thereby producing titanium dioxide and gaseous hydrogen chloride, (4) recovering the titanium dioxide, and (5) recycling the gaseous hydrogen chloride to convert more titanium nitride to the chloride.

4. A cyclic chloride process for the production of titanium dioxide which comprises (1) converting an iron containing titanium ore to metallic iron and titanium nitride by subjecting said ore at an elevated temperature in the presence of a reducing agent to a nitrogen containing atmosphere, (2) reacting the nitride portion of the resulting solid product at a relatively low elevated temperature with gaseous hydrogen chloride thereby vaporizing the titanium and nitrogen components of the nitride as volatile chlorides while leaving the iron behind as a recoverable metal residue, (3) oxidizing the titanium chloride in the vapor state by reaction with oxygen at an elevated temperature thereby producing titanium dioxide and gaseous chlorine, (4) recovering the titanium dioxide, (5) admixing the gaseous chlorine with gaseous hydrogen, and (6) recycling this admixture to convert more titanium nitride to the chloride.

References Cited by the Examiner

UNITED STATES PATENTS

| 957,842 | 5/10 | Bosch | 23—191 |
|---|---|---|---|
| 1,343,441 | 6/20 | Farup | 23—191 X |
| 1,391,148 | 9/21 | Von Bichowsky et al. | 23—191 |
| 1,408,661 | 3/22 | Von Bichowsky et al. | 23—191 |
| 1,842,620 | 1/32 | McInerny et al. | 23—202 |
| 1,850,286 | 3/32 | Mittasch et al. | 23—202 |
| 1,931,380 | 10/33 | Haber | 23—202 |
| 2,240,343 | 4/41 | Muskat | 23—202 |

OTHER REFERENCES

Jacobson's book, "Encyclopedia of Chem. Reactions," vol. 7, 1958 ed., page 423, Reinhold Publ. Corp. N.Y.

J. W. Mellor's book, "A Comprehensive Treatise on Inorganic and Theoretical Chem.," vol. 8, 1928 ed., pp. 119, 139. Longmans, Green & Co., N.Y.

Article by C. Montemartini and L. Losana, Giorn, Chem. Ind. Appl. 6, pages 323 and 324; 1924 ed.

MAURICE A. BRINDISI, *Primary Examiner.*